United States Patent
Joshi et al.

(10) Patent No.: US 12,058,118 B2
(45) Date of Patent: Aug. 6, 2024

(54) STANDARDIZED AUTHENTICATION MECHANISM INTEGRATING DIVERSE SOFTWARE PLATFORMS

(71) Applicant: UiPath, Inc., New York, NY (US)

(72) Inventors: Vineet Joshi, Denver, CO (US); Maxwell Warner, Denver, CO (US); Guy Van Wert, Denver, CO (US)

(73) Assignee: UiPath, Inc., New York, NY (US)

(*) Notice: Subject to any disclaimer, the term of this patent is extended or adjusted under 35 U.S.C. 154(b) by 282 days.

(21) Appl. No.: 17/504,108

(22) Filed: Oct. 18, 2021

(65) Prior Publication Data
US 2023/0122954 A1    Apr. 20, 2023

(51) Int. Cl.
*H04L 29/06*    (2006.01)
*G06F 9/54*    (2006.01)
*H04L 9/40*    (2022.01)

(52) U.S. Cl.
CPC .............. *H04L 63/08* (2013.01); *G06F 9/541* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,032,932 B2 | 10/2011 | Speyer et al. | |
| 2003/0126311 A1* | 7/2003 | Kushnirskiy | G06F 9/44526 712/E9.084 |
| 2003/0218633 A1* | 11/2003 | Mikhail | G06F 9/542 707/E17.117 |
| 2017/0006021 A1* | 1/2017 | Karaatanassov | H04L 63/0815 |
| 2018/0337907 A1* | 11/2018 | Bhansali | H04L 63/08 |
| 2020/0099691 A1 | 3/2020 | Akselrod et al. | |
| 2021/0240551 A1 | 8/2021 | Joyce et al. | |

OTHER PUBLICATIONS

Autho.com, Customize New Universal Login Pages (Oct. 1, 2020) available at https://auth0.com/docs/brand-and-customize/universal-login-page-templates#custom-user-interface.
Autho.com, Call Your API from Your Single-Page App (Oct. 1, 2020) available at https://auth0.com/docs/microsites/call-api/call-api-single-page-app.
Google, Creating a Custom Sign-In Page (Mar. 7, 2020) available at https://cloud.google.com/iap/docs/create-custom-auth-ui.

* cited by examiner

Primary Examiner — William J. Goodchild
(74) Attorney, Agent, or Firm — Volpe Koenig

(57) ABSTRACT

Disclosed herein is a method. The method is implemented by an authentication engine stored on a memory as processor executable instructions. The processor executable instructions are executed by at least one processor. The method (i.e., as implemented by the authentication engine) includes determining an authentication mechanism for an external system to a software platform, generating an interface, executing the authentication mechanism within the interface, authenticating an entity within the interface, and provisioning element instance details with respect to the authentication of the entity.

20 Claims, 8 Drawing Sheets

STANDARDIZED AUTHENTICATION MECHANISM INTEGRATING DIVERSE SOFTWARE PLATFORMS

BACKGROUND

The disclosure herein relates to electronic authentication, and particularly to a standardized authentication mechanism that integrates diverse software platforms.

Generally, a software platform includes one or more application programmable interfaces (i.e., a software intermediary) that enable the software platform to communicate with an external system (i.e., another software platform). That is, an application programmable interface (API) can enable integration between diverse software platforms.

Yet, most APIs do not have a standard and/or an automatic mechanism for authentication. In conventional practice, when an integration system developer builds a framework for external system integrations for the software platform, the integration system developer must manually write code for the framework to handle APIs with many different authentication types (i.e., because each external system needs authentication).

For example, when an end user system (i.e., an external system) is chosen by the integration system developer for integration, the integration system developer manually builds a user interface (UI) framework. This manually built UI framework can include custom fields, changes in naming conventions, entirely unique headers, etc. and is used to collect necessary authentication information from end users to establish a connection between the end user system and the software platform. However, this manually built UI framework does not fully follow authentication type standards (e.g., default authentication methods) and, rather, includes methods/configurations specific to the end user system. Additionally, because the manually built UI framework is frequently updated and changed (e.g., default fields needed to authenticate a connection to an API can update and change as often as the external system chooses), maintenance problems persistently arise with the software platform.

Thus, the manually written code of any software platform framework is fragile and specific, thereby requiring a considerable amount of time, work, and cost for creation and maintenance. And, despite the uniqueness of each software platform framework, end user product companies generally provide a same user experience to end users for authentication, which mean the resources spent to handle authentication nuances to enable user connections do not necessarily require unique user experiences.

What is needed is a mechanism for standardized authentication.

SUMMARY

According to one or more embodiments, a method is provided. The method includes determining, by the authentication engine stored on a memory as processor executable instructions being executed by at least one processor, an authentication mechanism for an external system to a software platform. The method also includes (i.e., as implemented by the authentication engine) generating an interface, executing the authentication mechanism within the interface, authenticating an entity within the interface, and provisioning element instance details with respect to the authentication of the entity.

According to one or more embodiments, a system is provided. The system includes a memory storing processor executable instructions for an authentication engine. The system also includes at least one processor executing the processor executable instructions to cause the system to (i.e., as implemented by the authentication engine) determine an authentication mechanism for an external system to a software platform and generate an interface. The processor executable instructions also to cause the system to (i.e., as implemented by the authentication engine) execute the authentication mechanism within the interface, authenticate an entity within the interface, and provision element instance details with respect to the authentication of the entity.

The embodiment above can be implemented as a method, an apparatus, a device, a system, and/or a computer program product.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

The disclosure herein relates to electronic authentication, and particularly to a standardized authentication mechanism that integrates diverse software platforms. To achieve the integration of diverse software platforms, the standardized authentication mechanism operates as an API layer of a resident software and/or a cloud software in the context of robotic process automations (RPAs), as well as machine learning (ML) and artificial intelligence (AI). That is, as the separate API layer, the standardized authentication mechanism provides automatic code creation and authentication regardless of an API type presented by an external system. Further, the standardized authentication mechanism automatically generates and presents a UI framework to collect necessary authentication information from end users to establish connections (a.k.a. element instances) via any API type. In this regard, the standardized authentication mechanism includes software and/or hardware (e.g., processor executable code that is necessarily rooted in the hardware) for robust and efficient connection handling for all external systems to the resident software and/or the cloud software, as well as user interface building. And, one or more technical effects, advantages, and benefits of the standardized authentication mechanism include time reductions, work efficiencies, and cost reductions due to the automatic code creation, authentication, and UI framework.

Figure 1:
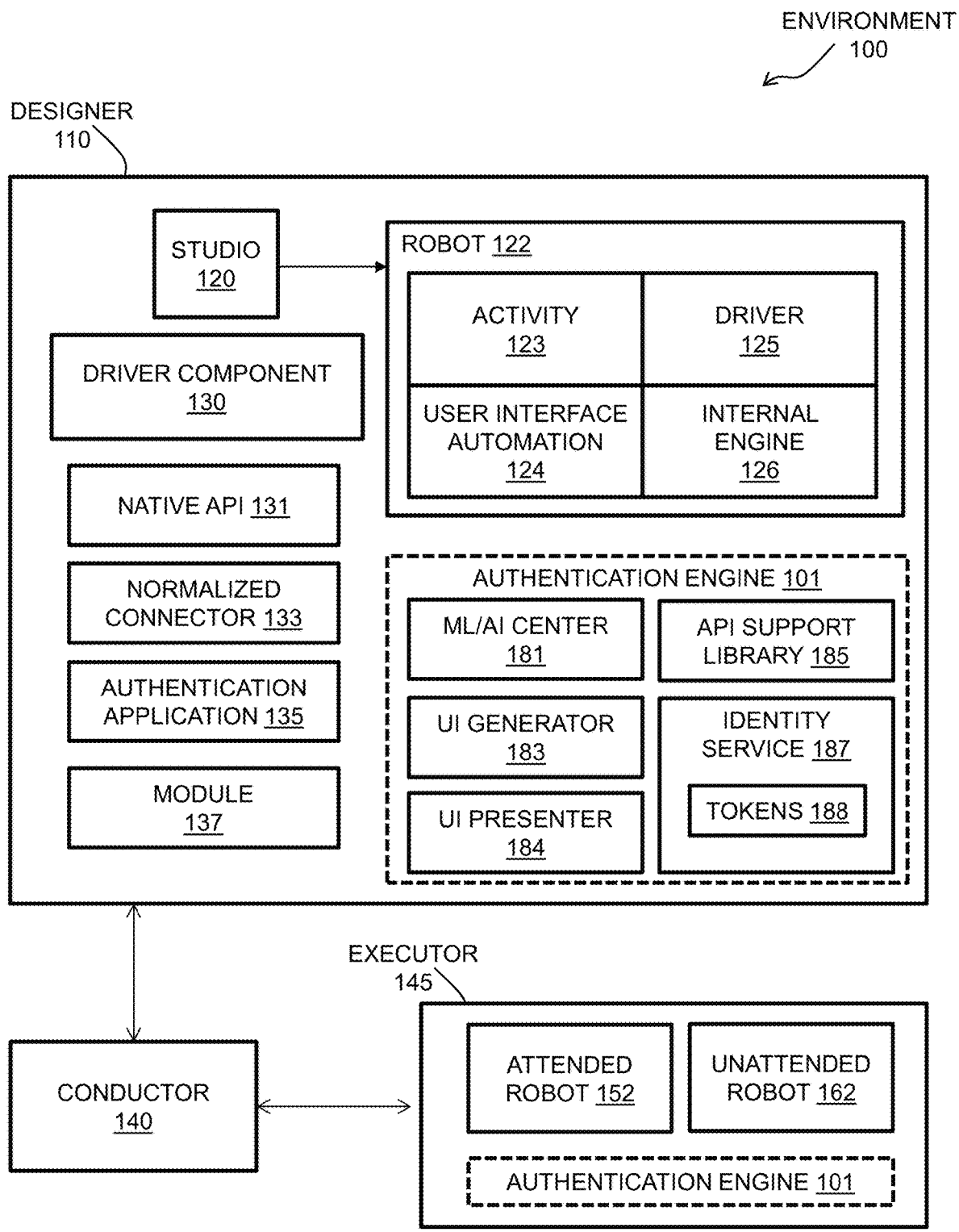
FIG. 1 depicts an environment illustrating development, design, operation, and/or execution of robotic process automations (RPAs) according to one or more embodiments.

FIG. 1 depicts an environment 100 illustrating development, design, operation, and/or execution a standardized authentication mechanism (referred herein as an "authentication engine 101") in the context of RPA, as well as ML/AI, according to one or more embodiments. The environment 100 can be a design and deployment computing platform that includes one or more components and communicates with one or more external systems.

The environment 100 depicts a designer 110 including a studio 120 and a robot 120. The robot 122 includes an activity 123, a user interface (US) automation 124, a driver 125, and an internal engine 126. The studio 120 further includes a driver component 130, a native API 131, a normalized connector 133, an authentication application 135, and a module 137.

The environment 100, also, depicts a conductor 140 and an executor 145. The designer 110, the conductor 140, and the executor 145 are representative of computing devices, computing apparatuses, and/or computing systems, which comprise hardware, software, or a combination thereof. The designer 110, the conductor 140, and the executor 145, and any software thereon (e.g., the authentication engine 101) are configured to interact with a user or an operator to receive inputs and provide outputs. The executor 145 further includes an attended robot 152 and an unattended robot 162, which are implementation examples of the robot 122 as described herein. The authentication engine 101 is detailed as a dashed-box to illustrate a scalability and a portability of the authentication engine 101 within the environment 100. In turn, the authentication engine 101 is shown within the designer 110 and the executor 145. The authentication engine 101 can include, but is not limited to, an ML/AI center 181, a UI generator 183, a UI presenter 184, an API support library 185, and an identity service 187 (which can include one or more tokens 188). Note that while a single block is shown for each of the one or more components of the environment 100, that single block is representative of one or more of that component.

The authentication engine 101, generally, is software and/or hardware that implements automatic code generation, robotic process automation, and UI generation, each of which is further described herein. Further, in accordance with one or more embodiments, the authentication engine 101 can provide or be part of a framework/mechanism (e.g., the environment 100) that automatically implements codes and designs the robot 122 within the studio 120 of the designer 110. In this regard, the authentication engine 101 can include one or more layers, such as a connector layer and central integration layer. The connector layer can implement and manage the normalized connectors 133. The central integration layer can mediate, transform, route, and convert authentication requests between a software intermediary and another software platform.

The designer 110 can be referred to as a studio platform, a development platform, and/or an online platform. The designer 110 can include one or more engines (e.g., the authentication engine 101), development environments (e.g., the studio 120), sub-programs (e.g., the authentication applications 135 or the modules 137), or the like and can be configured to generate code, instructions, commands, or the like for the robot 122 to perform or automate the activities 123 and/or provide the UI automations 124.

The designer 110, in conjunction with the authentication engine 101, can also enable developers and/or orchestrators (e.g., a user or operator) to code, program, and/or design the robot 122 through the studio 120. In an embodiment, the studio 120 can provide application integration, along with automating of third-party applications, administrative information technology (IT) tasks, and/or business IT processes. For example, the studio 120 can be an integration system that provides features and capabilities based on calls to APIs in external systems.

The robot 122 can perform the one or more activities 123 and/or provide the one or more UI automations 124 using the drivers 125 and/or the internal engines 126. That is, the robot 122 may be an application, applet, script, or the like that may perform and/or automate the activities 123 and/or the UI automations 124. Examples of deployed/implemented robots 122 include the attended robots 152 and the unattended robots 162.

The activity 123 can be representative of one or more workflows. A workflow (e.g., an RPA workflow) may include, but are not limited to, task sequences, flowcharts, Finite State Machines (FSMs), global exception handlers, UI transparents, or the like. Task sequences can be linear processes for handling linear tasks between one or more applications or UIs (e.g., windows). Flowcharts can be configured to handle complex business logic, enabling integration of decisions and connection of other activities 123 in a more diverse manner through multiple branching logic operators. FSMs can be configured for large workflows and use a finite number of states in their execution, which may be triggered by a condition, transition, other activity 123, or the like. Global exception handlers can be configured to determine workflow behavior when encountering an execution error, for debugging processes, or the like. UI transparents can be software operations to an underlying operating system (OS) or hardware. Non-limiting examples of operations that can be accomplished by one or more workflows may be one or more of performing log-ins, filling a form, information technology (IT) management, or the like.

The UI automations 124 can enable access, identification, and manipulation of UIs and UI elements of applications, software platforms, resident software, cloud software, etc. For instance, as part of RPAs of the robot 122, shapes (e.g., squares, rectangles, circles, polygons, freeform, or the like) in multiple dimensions may be utilized for UI robot development and runtime in relation to a computer vision (CV) operations of the UI automations 124. Thus, the UI automations 124 can be representative of any UI generation software and resulting UIs. For example, to run an activity 123 for a UI automation 124 (e.g., document processing), the robot 122 can uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like. The UI automation 124 can be performed/implemented by the robot 122 using the drivers 125.

The drivers 125 include one or more programming interfaces that control and manage specific lower level interfaces linked to (physical or virtual) hardware, low-level services, program, etc. The drivers 125 are leveraged by the robot to provide the activities 123 and/or the UI automations 124.

The internal engine 126 can be a core software component of the robot 122 that cause the robot 122 to operate automatically. For example, the internal engine 126 is a portion of the robot 122 that leverages the drivers 125 to provide the activities 123 and/or the UI automations 124.

According to one or more embodiments, the robots 122 may be configured as execution agents that run workflows (e.g., the activities 123) built in the designer 110. A commercial example of a robot(s) for UI or software automation is UiPath Robots™. In some embodiments, the robots 122 may install the Microsoft Windows® Service Control Manager (SCM)-managed service by default. As a result, such robots 122 can open interactive Windows® sessions under the local system account, and have the rights of a Windows® service. According to one or more embodiments, the robots 122 may have the same rights as a user under which a given robot is installed. This feature may also be available for High Density (HD) robots, which ensure full utilization of each machine at maximum performance such as in an HD environment. According to one or more embodiments, the robots 122 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between the conductor 140 and execution hosts (i.e., the computing systems on which the one or more robots are executed). These services may be trusted with and manage the credentials for the robots 122. User mode robot services may manage and monitor Windows® sessions and act as a proxy between conductor 140 and the execution hosts. User mode robot services may be trusted with and manage the credentials for robots. A Windows® application may automatically be launched if the SCM-managed robot service is not installed. In an example, the robot 122 may run given jobs under a Windows® session (e.g., they may execute workflows described herein) and may be aware of per-monitor dots per inch (DPI) settings. Agents may be Windows® Presentation Foundation (WPF) applications that display available jobs in a system tray window. Agents may be a client of the service. Agents may request to start or stop jobs and change settings. The command line may be a client of the service. The command line is a console application that can request to start jobs and waits for their output. According to one or more embodiments, configurations where components of the robots 122 are split helps developers, support users, and computing systems more easily run, identify, and track execution by each component. Special behaviors may be configured per component this way, such as setting up different firewall rules for the robot 122 and a service. The robot 122 may be aware of DPI settings per monitor in some embodiments. As a result, workflows may be executed at any DPI, regardless of the configuration of the computing system on which they were created. Projects from the designer 110 may also be independent of browser zoom level. For applications that are DPI-unaware or intentionally marked as unaware, DPI may be disabled in some embodiments.

The robot 122 and/or the authentication engine 101 may also engage with the driver components 130, the native APIs 131, the normalized connectors 133, the authentication applications 135, and the modules 137 within the designer 110.

The driver components 132 may be utilized for the UI automation 124 by the robot 122 to get elements of a UI. Similarly, the driver components 132 may be utilized for an activity 123 (e.g., document processing), by the robot 122 to get, determine, and/or predict entities of a document. In an example, a user input (e.g., a selection on a display) can be submitted by a user or an operator to the designer 110. The designer 110 provides this selection to the robot 122, and the robot 122 utilizes the driver components 132 to determine representative data of area(s) of a visual display (e.g., selected by the user or the operator). By way of example, the driver components 132 may include, but are not limited to, OS drivers, browser drivers, virtual machine drivers, enterprise drivers, and the like.

The native APIs 131 can be representative of a lightweight API interface provided or used by an application or subroutine. The native API 131, for instance, can be provided by an application provider (e.g., as any API technology) and represent a functional element for platform integration. Examples of API types include, but are not limited to type JSON Web Token (JWT), OpenID, Security Assertion Markup Language (SAML), Basic Auth, API Key, OAuth(1), OAuth2, OAuth 2.0, OAuth2Password, and MLS.

The normalized connectors 133 can be representative of connector objects (a.k.a., connector or element) and/or a list of the connector objects. According to one or more embodiments, the authentication engine 101 using the normalized connectors 133 can work with a normalized connector layer, such as Cloud Elements normalized Connector layer, and be interchanged with another normalized connector layer. Each connector object is a list of configuration parameters and/or logical code. In some cases, a normalized connector 133 can be a normalized version of the native API. For example, a connector object can include the normalized version of the native API made available as RESTful API with JSON payload in a central integration layer of the authentication engine 101. Further, a connector object can include logical code for a proprietary connector on top of salesforce API.

The authentication applications 135 can be representative of a software, a code, and/or an application configured in an external system (to the authentication engine 101) that provides a mechanism for the authentication engine 101 to authenticate a user in a trusted manner. According to one or more embodiments, the authentication engine 101 can store and depend on configured authentication applications 135 from external systems. The mechanism can be any API type or any native API 131, such as OAuth 2.0. According to one or more embodiments, once the authentication application 135 registered with the external system, the authentication engine 101 can store application credentials, so the developers and/or the orchestrators (e.g., a user or operator) to do not need to write a database.

The modules 137 can be representative of any combination of hardware (e.g., independent electronic circuits packaged onto a circuit board) and/or software (e.g., firmware), or other sub-software module, to provide a function within a computer. According to one or more embodiments, the modules 137 can be representative any independent discrete piece of code created and maintained to be used in different systems.

According to one or more embodiments, at development, the robot 122 can be produced at/by the designer 110 (e.g., the studio 120). Further, at deployment, the robot 122 may be managed, controlled, configured or the like at/by the conductor 140 and/or the authentication engine 101.

The conductor 140 can command or instruct the robots 122 or the executor 145 to execute or monitor the activities 123 or other workflows in a mainframe, web, virtual machine, remote machine, virtual desktop, enterprise platform, online platform, cloud environment, desktop app(s), browser, or the like client, application, or program. The conductor 140 may act as a central or semi-central point to instruct or command robots 122 to automate a computing platform (e.g., the environment 100).

In accordance with one or more embodiments, the conductor 140 may be configured for provisioning, deployment, configuration, queueing, monitoring, logging, and/or providing interconnectivity. The conductor 140 can further leverage/implement/execute the authentication engine 101 to perform any of these operations. Provisioning may include creating and maintenance of connections (e.g., element instances) or communication between the robots 122, the executor 145, and conductor 140. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). The conductor 140 may provide interconnectivity by acting as the centralized point of communication for third-party solutions and/or applications.

The executor 145 can command or instruct the robots 122 or the authentication engine 101 to execute or monitor the activities 123 or other workflows in a mobile computing and/or a mobile device environment. As noted herein, the conductor 140 and the executor 145 can download/acquire/transmit the authentication engine 101 and/or the robot 122. That is, the robot 122 can be provided as the attended robot 152 or the unattended robot 162, and the authentication engine 101 can be provided to the executor 145 as a separate instance. For attended operations, automation by the attended robot 152 may be performed by receiving input, commands, instructions, guidance, or the like from a third party component. For unattended operations, automation by the unattended robot 162 may be performed without third party inputs or control. The attended robot 152 and/or the unattended robot 162 may run or execute on mobile computing or environment of the executor 145.

Also, the authentication engine 101 and/or the robots 122 (regardless of location) can leverage the ML/AI center 181, the UI generator 183, the UI presenter 184, the n API support library 185, and the identity service 187 to provide (which can include one or more tokens 188).

The ML/AI center 181 can include a ML sub-program that expresses/derives meaning of entities (e.g., distinct software agent or object) to find relationships therebetween via conceptual, data, logical, and/or physical modelling. Further, ML/AI center 181 can include an AI sub-program that extracts and/or predicts entities and relationships based on at least the model 185 and features generated therefrom. For example, the ML/AI center 181 can build, manage, and/or stores algorithms and/or models, such as statistical mathematical models that embodies a set of statistical assumptions, concerning a generation of features from the documents. The features can be customizable so the authentication engine 101 can identify and extract the entities, e.g., made available within the studio 120. An example of the feature customization includes a counterfactual regret minimization (CFR) algorithm with custom features applied for contextual ML and used for structured predictions or a custom and dynamic named entity recognition (NER) NER framework that tag entities of fields before feature training.

The UI generator 183 can include a UI and graphic UI (GUI) sub-programs for users and/or RPAs to create/generate/manage UIs, GUIs, and the like. As discussed herein, UIs and GUIs can include, but are not limited to, UIs include, but are not limited to, internet browsers, graphic user interfaces, window interfaces, and/or other visual interfaces for applications, operating systems, file folders, and the like. The UI presenter 184 can include one or more sub-modules for providing or displaying the UIs, GUIs, and the like generated by the UI generator 1834. According to one or more embodiments, the UI generator 183 can integrate with the ML/AI center 181 and the UI presenter 184 to create connections (e.g., element instances) to underlying connectors (e.g., elements).

The API support library 185 can include, store, and manage classes, objects, and methods, which that closely resemble APIs. According to one or more embodiments, the API support library 185 can include a set of code libraries that provide backward-compatible versions of any API type or any native API 13.

The identity service 187 can include mechanisms and/or protocols that provide a standardized format allowing developers and/or orchestrators (e.g., a user or operator) to input their identity and access management system controls for enhance connection access sharing.

The tokens 188 can include mechanisms and/or protocols that enable authenticating or identity authentication with applications (and in some cases bypass two-step verification and the like), as well as reviewing and revoking the mechanisms through managed accounts. Each token 188 can be unique and include a stamped ticket. In an example, once access to a web site is granted with respect to a unique token, a user can leverage that unique rather than having to re-enter credentials each time they go back to the same webpage, app, or any resource protected with that same token. Examples of tokens 188 include, but are not limited to, alphanumeric characters, constants, identifiers, operators, separators, and/or reserved words, as well as a short string of hexadecimal characters and structured tokens (e.g., JSON Web Token). According to one or more embodiments, the token 188 can be a bearer tokens or other access token used with OAuth 2.0, The bearer token is an opaque string, not intended to have any meaning.

According to one or more embodiments, the identity service 187 with the token 188 grants a user access to the authentication engine 101, which creates and stores the underlying system connection through the normalized connector 133, after which an end user can make requests to a new connection through the same bearer token. One or more technical effects and benefits includes providing this unified authorization to both create and use connections through a single managed bearer token (e.g., the token 188), which can grant further benefits in access control to that connection for shared access. In conventional practice, this is not possible without creating security concerns through sharing credentials.

According to one or more embodiments, the authentication engine 101 can provide a normalization of a service provider authentication using a token mechanism (e.g., the token 188). For example, Sales force provides token and refresh tokens with basic authentication, like a session ID, a username, and/or a password, for every time you call the API. The token mechanism essentially normalizes the API invocation experience. For instance, the authentication engine 101 utilizes a single token translated on what the service provider authentication needs.

Figure 2:
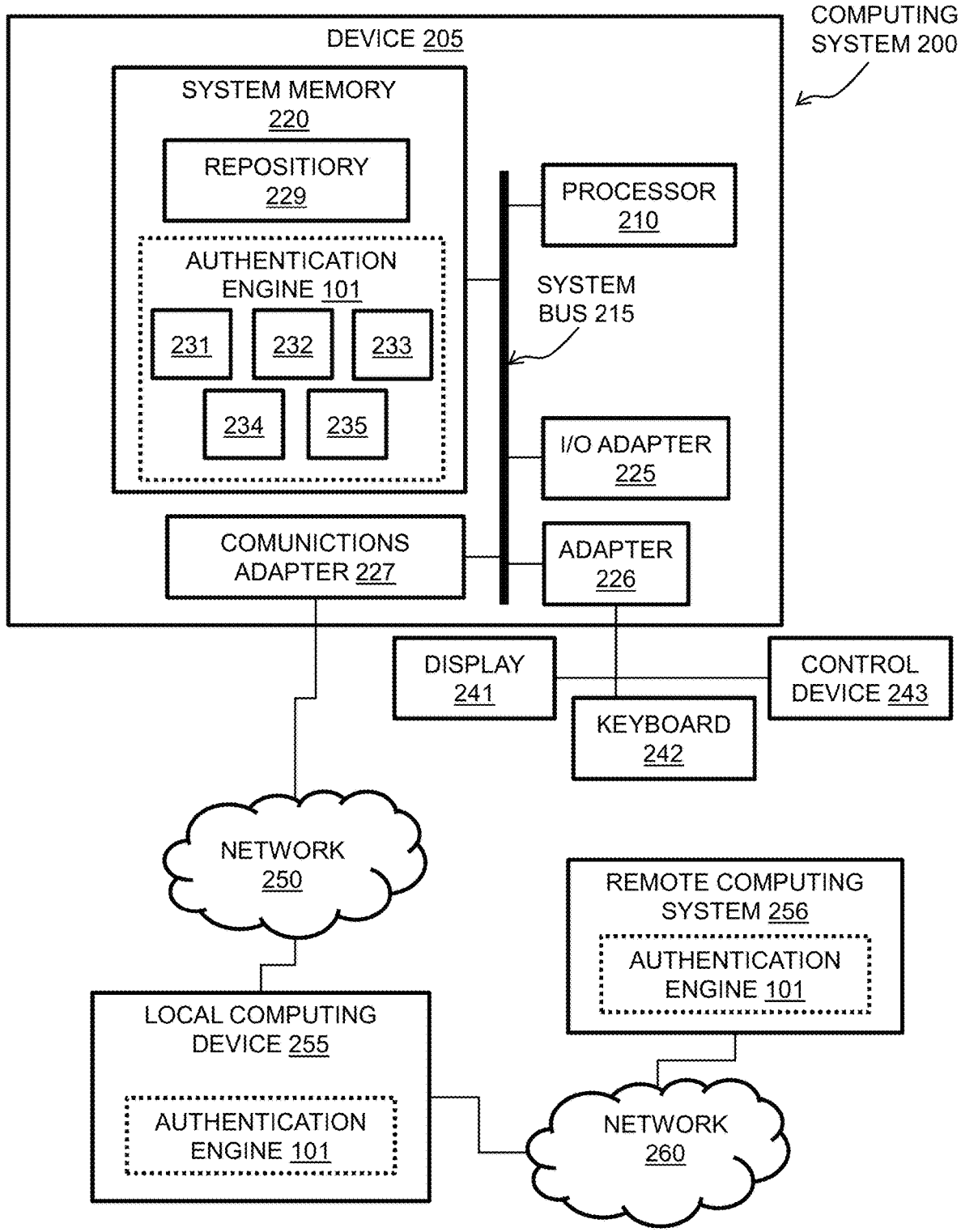
FIG. 2 is an illustration of a computing system according to one or more embodiments.

Turning now to FIG. 2, a computing system 200 is illustrated according to one or more embodiments. For ease of explanation and brevity, items and elements of FIG. 1 are reused with respect to the FIG. 2.

The computing system 200 can be representative of any computing device, computing apparatus, and/or computing environment, which comprise hardware, software, or a combination thereof. For example, the computing system 200 can be representative of hardware supporting the authentication engine 101, the designer 110, the conductor 140, and the executor 145. Further, embodiments of the computing system 200 disclosed may include apparatuses, systems, methods, and/or computer program products at any possible technical detail level of integration.

The computing system 200 has a device 205 (e.g., the designer 110, the conductor 140, and the executor 145 of FIG. 1) with one or more central processing units (CPU(s)), which are collectively or generically referred to as a processor 210. The processor 210, also referred to as processing circuits, is coupled via a system bus 215 to a system memory 220 and various other components. The computing system 200 and/or the device 205 may be adapted or configured to perform as an online platform, a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

The processor 210 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. The processor 210 may also have multiple processing cores, and at least some of the cores may be configured to perform specific functions. Multi-parallel processing may also be configured. In addition, at least the processor 210 may be a neuromorphic circuit that includes processing elements that mimic biological neurons. The processor 210 can also be representative of cloud processing across the computing system 200.

The system bus 215 (or other communication mechanism) is configured for communicating information or data to the processor 210, the system memory 220, and various other components, such as the adapters 225, 226, and 227.

The system memory 220 is an example of a (non-transitory) computer readable storage medium, where a repository 229 can be located/managed and/or software (e.g., an authentication engine 101) can be stored. For instance, the system memory 220 can include any combination of a read only memory (ROM), a random access memory (RAM), internal or external Flash memory, embedded static-RAM (SRAM), solid-state memory, cache, static storage such as a magnetic or optical disk, or any other types of volatile or non-volatile memory. Non-transitory computer readable storage mediums may be any media that can be accessed by the processor 210 and may include volatile media, non-volatile media, or the like. For example, the ROM is coupled to the system bus 215 and may include a basic input/output system (BIOS), which controls certain basic functions of the device 205, and the RAM is read-write memory coupled to the system bus 215 for use by the processors 210. Non-transitory computer readable storage mediums can include any media that is removable, non-removable, or the like.

The repository 229 can database (e.g., an SQL database) and/or another storage mechanism. According to one or more embodiments, the repository 229 can include automations and other data as described herein (e.g., documents, entities, confidence metrics, images, segments, hashes, video, frames, source data, robot video, source code, etc.) for access by the authentication engine 101. For example, a model can be built and stored in the repository 229 during a training phase of the authentication engine 101. According to one or more embodiments, the repository 229 can store the driver components 130, the native APIs 131, the normalized connectors 133, the authentication applications 135, and the modules 137.

The authentication engine 101 can be configured in hardware, software, or a hybrid implementation. According to one or more embodiments, the authentication engine 101 can be stored as software components, modules, engines, instructions, or the like for execution by the processor 210 to cause the device 205 to operate.

According to one or more embodiments, the authentication engine 101 can be composed of modules that are in operative communication with one another, and to pass information or instructions. In connection with FIG. 1, the authentication engine 101 of FIG. 2 can be representative of authentication engine 101 and components therein. The authentication engine 101 being stored on the system memory 220 and executed by the processor 210 can, thus, design/configure/provide the robot 122, perform the activities 123, and provide the UI automations 124. The authentication engine 101 of FIG. 2 can also be representative of an operating system for the device 205 for the computing system 200. According to one or more embodiments, the authentication engine 101 can provide UIs, such as on behalf of the operating system or other application and/or directly as needed to provide a mechanism for standardized authentication. The UIs include, but are not limited to, internet browsers, graphic user interfaces, window interfaces, and/or other visual interfaces for applications, operating systems, file folders, and the like. Thus, user activity can include any interaction or manipulation of the user interfaces provided by the authentication engine 101.

The authentication engine 101 can further include custom modules to perform application specific processes or derivatives thereof, such that the computing system 200 may include additional functionality. For example, according to one or more embodiments, the authentication engine 101 may be configured to store information, instructions, commands, or data to be executed or processed by the processor 210 to enable operations 231, 232, 233, and 234. For instance, the authentication engine 101 can provide a specific configuring and tooling robotic document processing method to the computing system 200, so that the computing system 200 can determine (321) an authentication mechanism for an external system to a software platform; generate an interface (232); execute (233) the authentication mechanism within the interface; and authenticate (234) an entity within the interface; and provision (235) element instance details with respect to the authentication of the entity. As noted herein, an element instance can be considered a connection between the external system and the software platform, where an element or connector is used as a template to create the element instance or connection.

With respect to the adapters 225, 226, and 227 of FIG. 2, the device 205 can particularly include an input/output (I/O) adapter 225, a device adapter 226, and a communications adapter 227. According to one or more embodiments, the I/O adapter 225 can be configured as a small computer system interface (SCSI), of in view of frequency division multiple access (FDMA) single carrier FDMA (SC-FDMA), time division multiple access (TDMA), code division multiple access (CDMA), orthogonal frequency-division multiplexing (OFDM), orthogonal frequency-division multiple access (OFDMA), global system for mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication. The device adapter 226 interconnects input/output devices to the system bus 215, such as a display 241, a keyboard 242, a control device 243, or the like (e.g., a camera, a speaker, etc.).

The communications adapter 226 interconnects the system bus 215 with a network 250, which may be an outside network, enabling the device 205 to communicate data with other such devices (e.g., such as the local computing device 255 and, further, the remote computing system 256 through the network 260). In one embodiment, the adapters 225, 226, and 227 may be connected to one or more I/O buses that are connected to the system bus 215 via an intermediate bus bridge. Suitable I/O buses for connecting peripheral devices such as hard disk controllers, network adapters, and graphics adapters typically include common protocols, such as the Peripheral Component Interconnect (PCI).

The display 241 is configured to provide one or more UIs or GUIs that can be captured by and analyzes by the authentication engine 101, as the users interacts with the device 205. Examples of the display 241 can include, but are not limited to, a plasma, a liquid crystal display (LCD), a light emitting diode (LED), a field emission display (FED), an organic light emitting diode (OLED) display, a flexible OLED display, a flexible substrate display, a projection display, a 4K display, a high definition (HD) display, a Retina© display, an in-plane switching (IPS) display or the like. The display 241 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

The keyboard 242 and the control device 243, such as a computer mouse, a touchpad, a touch screen, a keypad, or the like, may be further coupled to the system bus 215 for input to the device 205. In addition, one or more inputs may be provided to the computing system 200 remotely via another computing system (e.g., the local computing device 255 and/or the remote computing system 256) in communication therewith, or the device 205 may operate autonomously.

According to one or more embodiments, the functionality of the device 205 with respect to the authentication engine 101 can also be implemented on the local computing device 255 and/or the remote computing system 256, as represented by separate instances of the authentication engine 101. Note that the one or more documents can be stored in a common repository (e.g., the repository 229) located at the device 205, the local computing device 255, and/or the remote computing system 256 and can be downloaded (on demand) to and/or from each of the device 205, the local computing device 255, and/or the remote computing system 256.

Figure 3:
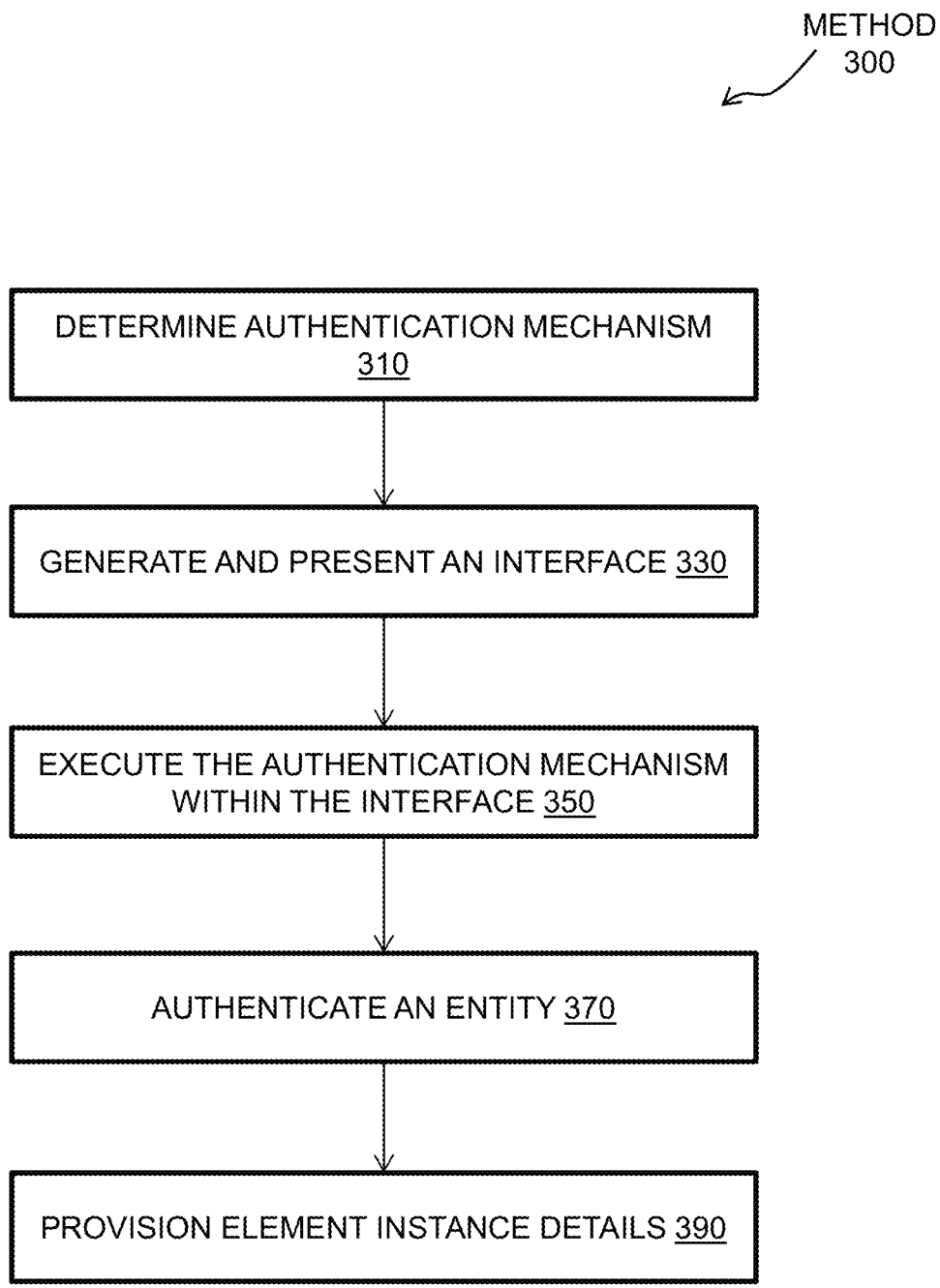
FIG. 3 illustrates a method according to one or more embodiments.

Turning now to FIG. 3, a block diagram illustrating a method 300 according to one or more embodiments. More particularly, the method 300 is an example implementation of the authentication engine 101 described herein to provide a specific configuring and tooling robotic document processing method with respect to the intelligent automation experience. For ease of explanation and brevity, items and elements of FIGS. 1-2 are reused with respect to the FIG. 3.

Generally, the method 300 enabled configuration parameters to be placed in a cloud so that the authentication engine 101 can build AI to manage electronic authentication. More particularly, the method 300 illustrates how the authentication engine 101 operates as an API layer of a resident software and/or a cloud software in the context of RPAs to provide automatic code creation and authentication regardless of an API type presented by an external system. Further, the method 300 illustrates how the authentication engine 101 automatically generates and presents a UI framework to collect necessary authentication information from end users to establish connections via any API type. One or more technical effects, advantages, and benefits of the method 300 include time reductions, work efficiencies, and cost reductions due to the automatic code creation, authentication, and UI framework.

The process flow 300 begins at block 310, where the authentication engine 101 determines an authentication mechanism. For example, once an external system is identified, the authentication engine 101 automatically determines what authentication type is required by that external system (e.g., another application, such as NetSuite, SAP, Quickbooks, and Microsoft Online). According to one or more embodiments, the authentication engine 101 consumes metadata configuration parameters from the normalized connector 133 to determine an underlying API connector of the external system. Note that the authentication engine 101 can leverage/implement/execute the robot 122 or the like to determine the authentication mechanism.

At block 330, the authentication engine 101 generates and presents an interface. The interface is generated based on requirements of the underlying API connector. The interface is used to collect information/data/credentials for authentication from the end users, the developers, the orchestrators (e.g., a user or operator), and/or other entity.

According to one or more embodiments, the authentication engine 101 provides a UI creation regardless of underlying authentication type and navigates a corresponding UI to the display 241 for an end user. The corresponding UI can span a wide range of interfaces, such as a self-generating UI at runtime based on requirements of the underlying API connector. According to one or more technical effects and benefits of the authentication engine 101, the developers and/or orchestrators (e.g., a user or operator), as well as end user, are not required for configuration input because the authentication engine 101 creates a UI form for each connector at runtime based on the configuration of the connectors. According to one or more embodiment, FIGS. 4-7 highlight different examples of how that UI is generated as a technical solution for the developers and/or orchestrators (e.g., a user or operator). Note that the authentication engine 101 can leverage/implement/execute the robot 122 or the like to generate and present the interface.

Figure 4:
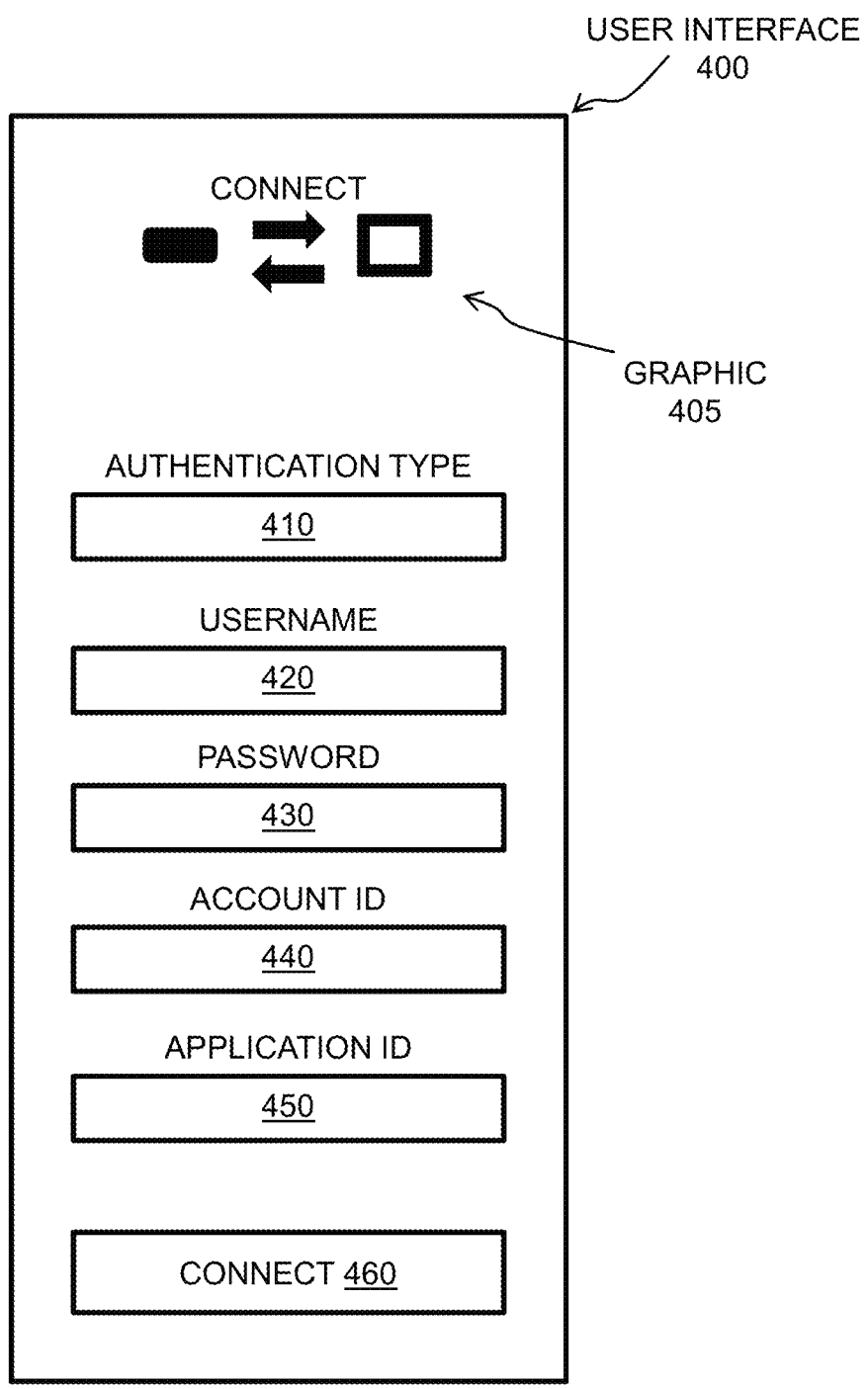
FIG. 4 illustrates an example user interface according to one or more embodiments.

FIG. 4 illustrates an example user interface 400 according to one or more embodiments. The user interface 400 depicts a graphic 405, which can demonstrate visually how the authentication engine 101 is connecting to another application (e.g., NetSuite). The user interface 400 depicts one or more fields, each of which can be a location for receiving a predetermined type of data based on requirements of the underlying API connector. Examples of the one or more fields include, but are not limited to, such as an authentication type field 410, a username 420 field, a password field 430, an account ID field 440, and an application field 450. The user interface 400 depicts a connect button 460 that can engage an authentication execution (at block 350) once the data has been entered into the one or more fields. For instance, upon hitting the connect button 460, the authentication engine 101 (e.g., Teamplay application therein) can change, read, write, modify, and delete account data (e.g., of a NetSuite account) on behalf of the end user, the developers, and/or orchestrators.

Figure 5:
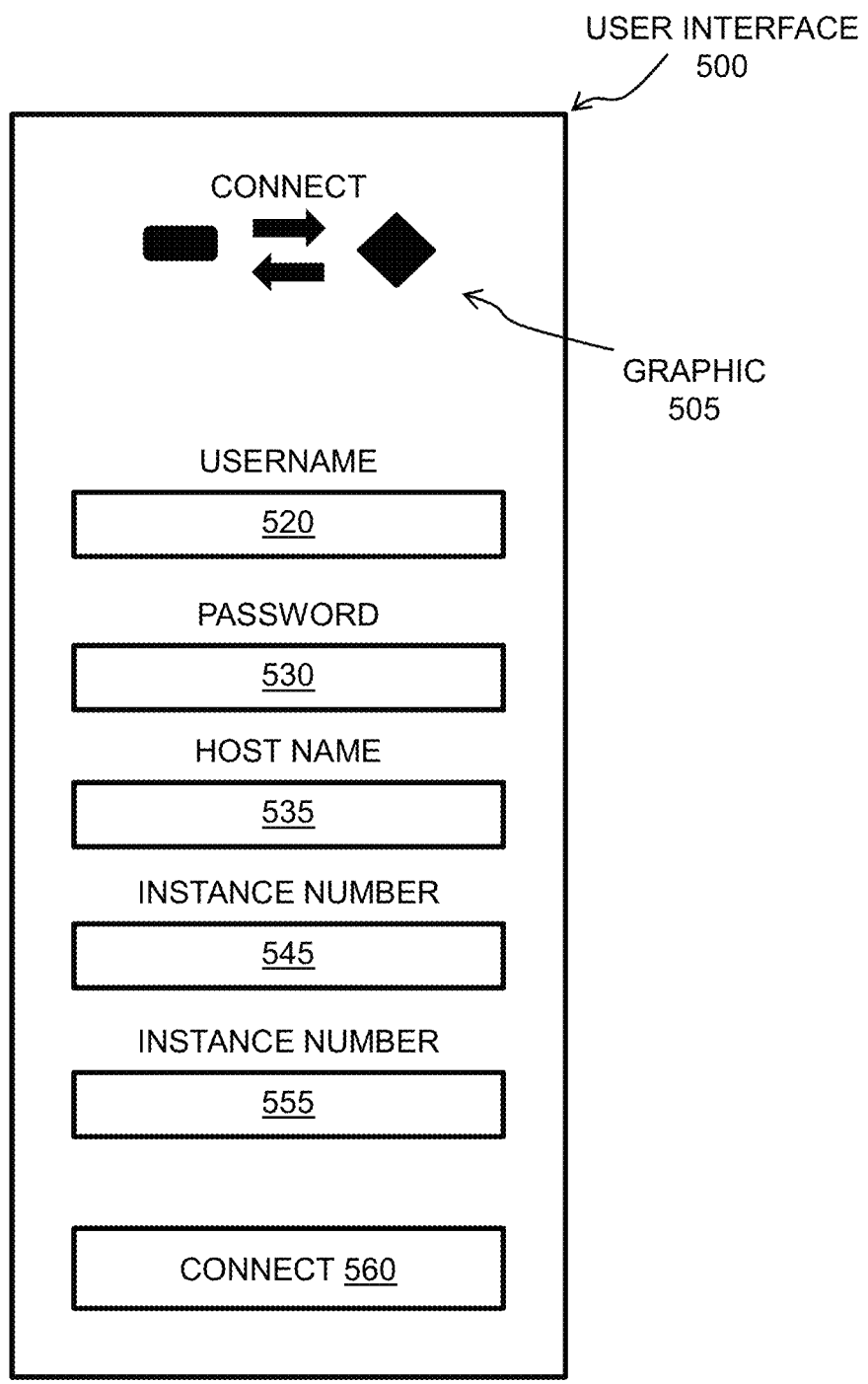
FIG. 5 illustrates an example user interface according to one or more embodiments.

FIG. 5 illustrates an example user interface 500 according to one or more embodiments. The user interface 500 depicts a graphic 505, which can demonstrate visually how the authentication engine 101 is connecting to another application (e.g., SAP). The user interface 500 depicts one or more fields, each of which can be a location for receiving a predetermined type of data based on requirements of the underlying API connector. Examples of the one or more fields include, but are not limited to, such as a username 520 field, a password field 530, a host name field 535, and instance number fields 545 and 555. The user interface 500 depicts a connect button 560 that can engage an authentication execution (at block 350) once the data has been entered into the one or more fields. For instance, upon hitting the connect button 460, the authentication engine 101 (e.g., BrightTalk application therein) can change, read, write, modify, and delete account data (e.g., of a Marketo account) on behalf of the end user, the developers, and/or orchestrators.

Figure 6:
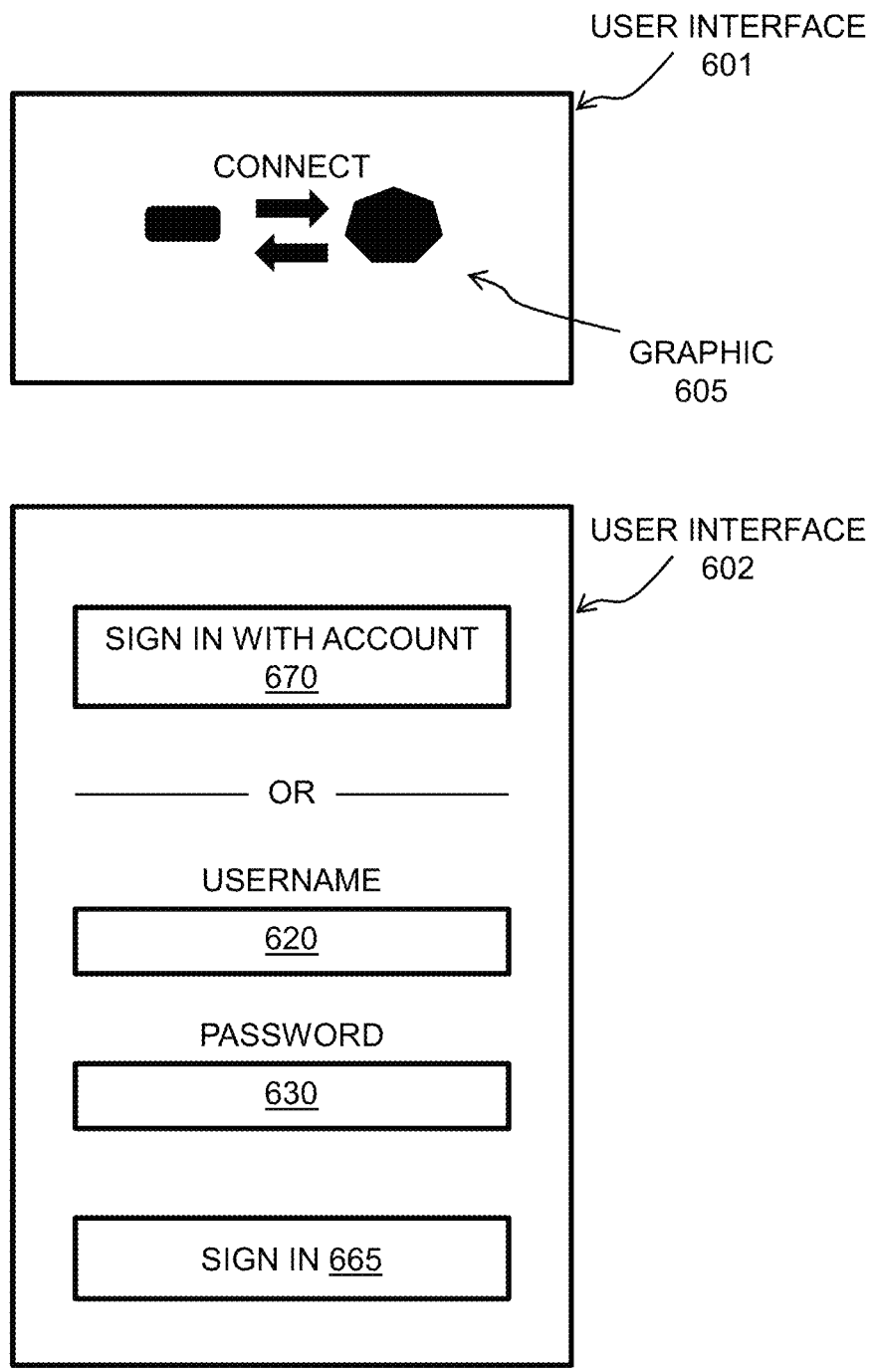
FIG. 6 illustrates an example user interfaces according to one or more embodiments.

FIG. 6 illustrates example user interfaces 601 and 602 according to one or more embodiments. The user interface 601 depicts a graphic 605, which can demonstrate visually how the authentication engine 101 is connecting to another application (e.g., Quickbooks). The user interface 601 can also indicate how the authentication application 135 is directing to an online version of the application (e.g., Quickbooks online). In turn, the user interface 602 can open as a pop-up or in a web browser. The user interface 602 depicts one or more fields, each of which can be a location for receiving a predetermined type of data based on requirements of the underlying API connector. Examples of the one or more fields include, but are not limited to, such as a username 620 field and a password field 630. The user interface 600 also depicts a sign in button 665 that can engage an authentication execution (at block 350) once the data has been entered into the one or more fields. The user interface 600 also depicts a sign in with account button 670 that can leverage another authentication account (e.g., Google or Facebook) to access the online version of the application. Additionally, the user interface 602 can include options to update passwords, create account, and verify identity.

Figure 7:
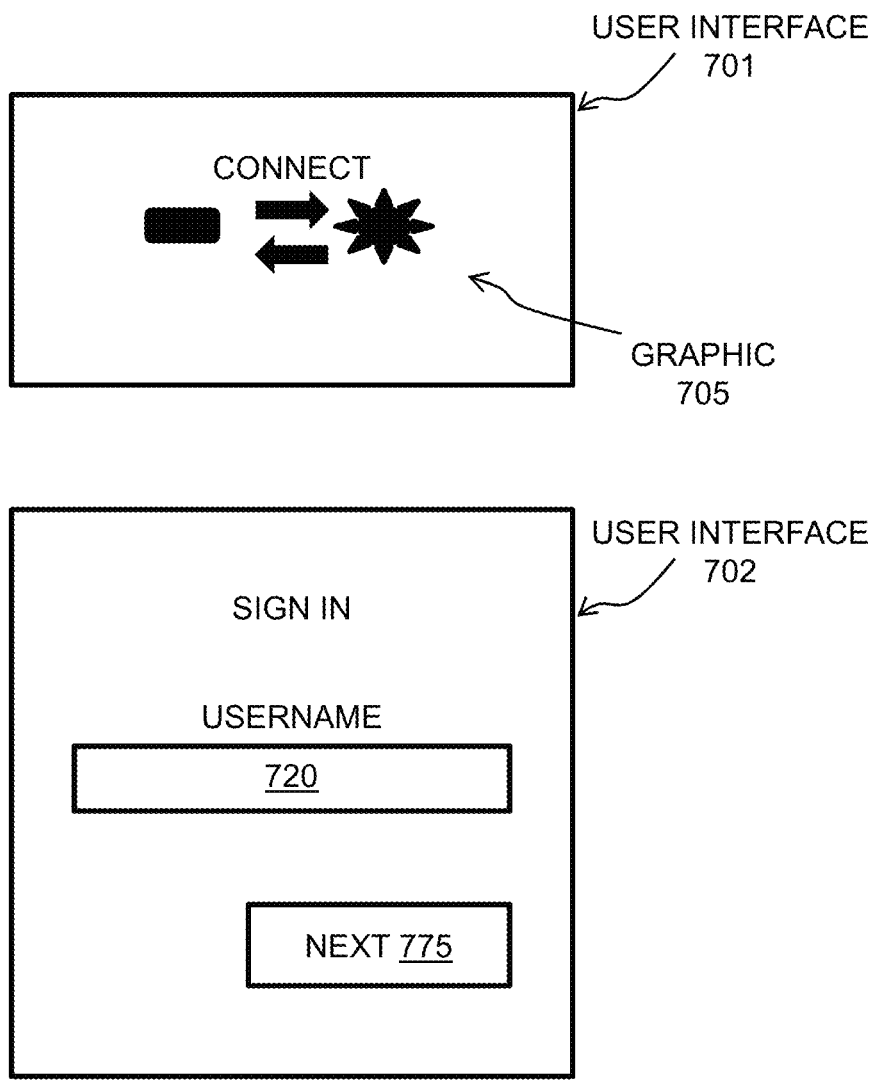
FIG. 7 illustrates an example user interfaces according to one or more embodiments.

FIG. 7 illustrates example user interfaces 701 and 702 according to one or more embodiments. The user interface 701 depicts a graphic 705, which can demonstrate visually how the authentication engine 101 is connecting to another application. The user interface 701 can also indicate how the authentication application 135 is directing to an online version of the application (e.g., Microsoft Online). In turn, the user interface 702 can open as a pop-up or in a web browser. The user interface 702 depicts one or more fields, such as a user name field 720, based on requirements of the underlying API connector. The user interface 702 can also provide a series of field after the user engages a next button 775. For instance, after a user completes the user name field 720 and clicks the next button 775, a password field may be presented by the user interface 702. Once all data is entered, the authentication engine 101 can engage an authentication execution (at block 350).

At block 350, the authentication engine 101 executes the authentication mechanism within the interface. To execute the authentication mechanism, the authentication engine 101 automatically makes this request with a single unified API call (i.e., issues a call). According to one or more embodiments, the authentication engine 101 provides an authorization layer to any newly connected external system (e.g., another application, such as NetSuite, SAP, Quickbooks, and Microsoft Online) that is independent of an underlying API therein to give additional access control benefits to developers and/or orchestrators (e.g., a user or operator), as well as end user. This authorization layer combined with the interface can provide, for example, an OAuth2 type experience. Note that the authentication engine 101 can leverage/implement/execute the robot 122 or the like to execute the authentication mechanism within the interface.

At block 370, the authentication engine 101 authenticates an entity. The entity can be an end user, a developer, an orchestrator (e.g., a user or operator), an RPA, or the like with respect to corresponding the information/data/credentials provided in block 330. In this regard, the authentication engine 101 confirms verification of the information/data/credentials and enables the entity to access the external system. At block 390, the authentication engine 101 provisions element instance details with respect to the authentication of the entity. The element instance can be considered a connection between the external system and the software platform, where an element or connector is used as a template to create the element instance or connection. Note that the authentication engine 101 can leverage/implement/execute the robot 122 or the like to authenticate and provision.

The method 300 can accommodate many variations of authentications including, but not limited to, an OAuth redirect to end provider, a dynamically generated form based on configuration parameters (e.g., pulling from a set of configuration connectors on the cloud element), a pre-provisional generated form followed by OAuth redirect, and an OAuth redirect followed by a post-provisional generated form. In doing so, the authentication engine 101 leverages the repository 229 to access lists and subsequent parameters, on a per application basis.

Figure 8:
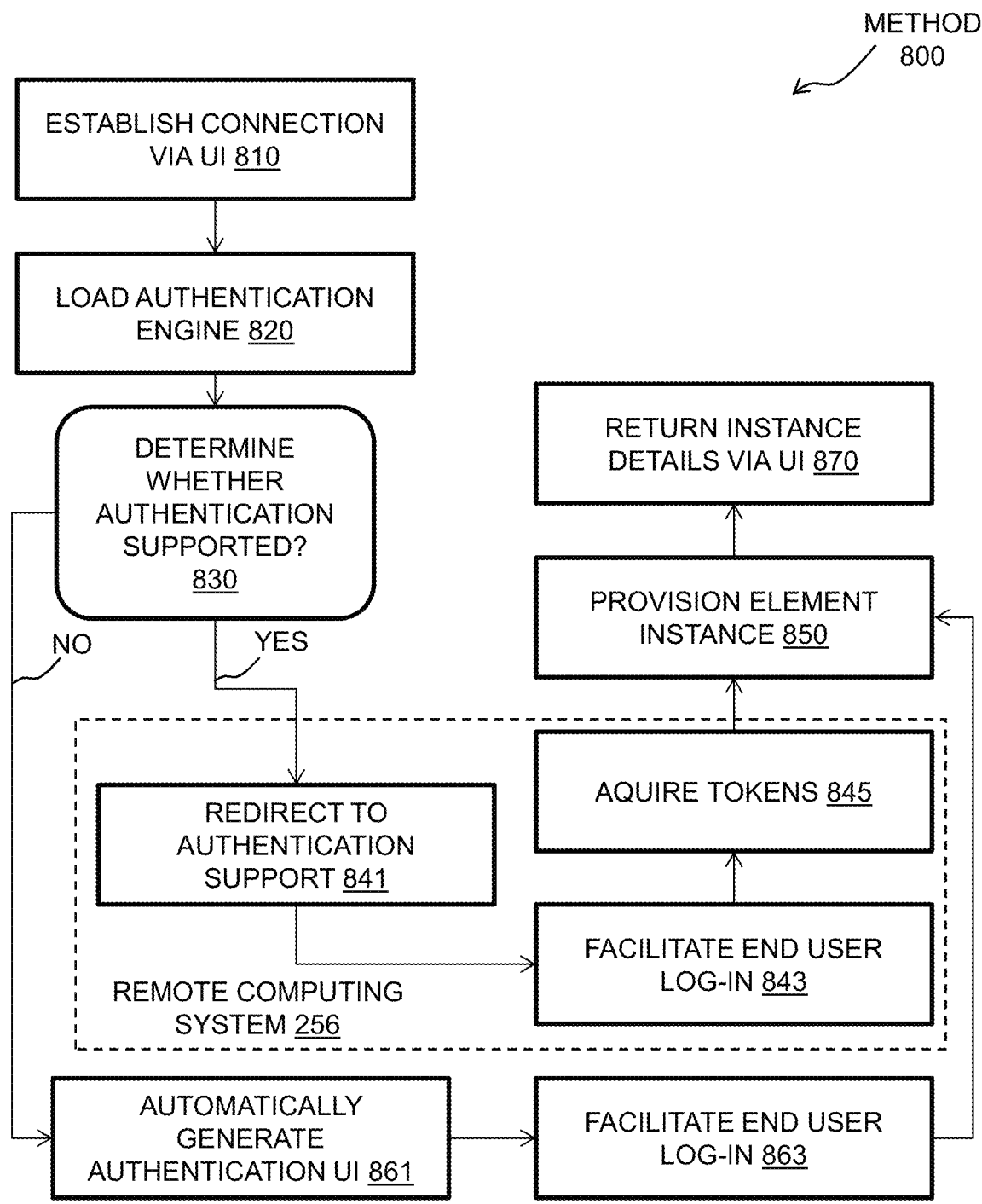
FIG. 8 illustrates a method according to one or more embodiments.

FIG. 8 is a block diagram illustrating a method 800 according to one or more embodiments. The method 800 illustrates a single API call in a workflow decision tree of UI components based on authentication type.

The method 800 begins at block 810, where the studio 120 establishes a connection via a UI to an external application (of the remote computing system 256). The studio 120 can operating on the device 205. The external application prevents access by the studio 120 without proper authentication. The studio 120, recognizing that authentication is required, loads the authentication engine 101 (at block 820). The authentication engine 101 can now be operating on the device 205 with the studio 120.

At decision block 830, the authentication engine 101 determines whether authentication is supported for the external application. For instance, the authentication engine 101 can check or search the API support library 185. The method 800 proceeds to block 841 if the authentication is supported for the external application (as shown by the YES arrow).

At block 841, the external application is redirected to authentication support. At block 843, the authentication engine 101 facilitates end user log-in. At block 863, the external application acquires tokens. Note that the operations of blocks 841, 843, and 845 can occur within the remote computing system 256. At block 850, the authentication engine 101 provision element instances based on the authentication (e.g., the authentication engine 101 loads the tokens 188 into the identity service 187). Thereby, the authentication engine 101 abstracts code and decision making of the authentication.

Returning to block 830, the method 800 proceeds to block 861 if the authentication is not supported for the external application (as shown by the NO arrow). At block 861, the authentication engine 101 automatically generates the authentication UI. At block 863, the authentication engine 101 facilitates end user log-in. Then, the method 800 proceeds to block 850.

At block 870, the authentication engine 101 returns the instance details via the UI.

According to one or more embodiments, the authentication engine 101 can implement 'eventing', such as webhooks. For instance, the authentication engine 101 can approach the question of how to choose and implement additional options once there is a connection. A webhook can include a mechanism for augmenting or altering a behavior of a web page or web application with custom callbacks maintained, modified, and managed the authentication engine 101.

According to one or more embodiments, the authentication engine 101 leverage any authorization to a new connection by sharing across multiple users using the tokens 188 and granting access to the connection through the identity service 187. Note that other end users can use and access the same connection without needing to know the underlying connection credentials or details.

According to one or more embodiments, the authentication engine 101 can include a connector builder that enable the developers and/or the orchestrators (e.g., a user or operator) to extend or implement proprietary authentication mechanisms based on the application requirement. In this way, the authentication engine 101 can provide flexibility when metadata is hard coded. The connector builder also allows the end user to include additional authentication parameters and is not limited only to modification of parameters. Now, those may or may not be required by the application provider for specifically authentication, yet the connector building can add the additional authentication parameters just for connectivity. For example, if a user extends a connector for the SAP application by adding two more parameters that are specific to the user SAP implementation, which can eventually reflect on the UI. These customizations can be included in the authentication engine 101 through this connector builder.

According to one or more embodiments, a method is provided. The method includes determining, by the authentication engine stored on a memory as processor executable instructions being executed by at least one processor, an authentication mechanism for an external system to a software platform. The method also includes (i.e., as implemented by the authentication engine) generating an interface, executing the authentication mechanism within the interface, authenticating an entity within the interface, and provisioning element instance details with respect to the authentication of the entity.

According to one or more embodiments, a system is provided. The system includes a memory storing processor executable instructions for an authentication engine. The system also includes at least one processor executing the processor executable instructions to cause the system to (i.e., as implemented by the authentication engine) determine an authentication mechanism for an external system to a software platform and generate an interface. The processor executable instructions also to cause the system to (i.e., as implemented by the authentication engine) execute the authentication mechanism within the interface, authenticate an entity within the interface, and provision element instance details with respect to the authentication of the entity.

According to one or more embodiments or any of the system and/or method embodiments herein, the authentication mechanism can be generated based on requirements of an underlying application programmable interface (API) connector of the external system.

According to one or more embodiments or any of the system and/or method embodiments herein, the interface can be used to collect information for authentication of the entity.

According to one or more embodiments or any of the system and/or method embodiments herein, the authentication engine can automatically issue a single unified application programmable interface (API) call to execute the authentication mechanism.

According to one or more embodiments or any of the system and/or method embodiments herein, the authentication engine can provide an authorization layer to the external system that is independent of an underlying application programmable interface (API) connector of the external system.

According to one or more embodiments or any of the system and/or method embodiments herein, the authorization layer combined with the interface can provide an OAuth2 experience.

According to one or more embodiments or any of the system and/or method embodiments herein, the authentication engine can include an identity service that provides a standardized format allowing the interface to receive identity and access management system controls for authentication of the entity.

According to one or more embodiments or any of the system and/or method embodiments herein, the generating of the interface can further include generating and presenting a first interface on a display local to the authentication engine or causing an external system to generate and present a second interface based on the authentication mechanism.

According to one or more embodiments or any of the system and/or method embodiments herein, the authentication engine can include a user interface (UI) generator or a UI presenter that generates the interface for display.

According to one or more embodiments or any of the system and/or method embodiments herein, the authentication engine can include an application programmable interface (API) support library that stores and manages a set of code libraries that provide backward-compatible versions of any API type or any native API.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although features and elements are described above in particular combinations, one of ordinary skill in the art will appreciate that each feature or element can be used alone or in any combination with the other features and elements. For instance, for any of the methods and processes described herein, the steps recited may be performed out of sequence in any order and sub-steps not explicitly described or shown may be performed. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic. In addition, "coupled" or "operatively coupled" may mean that objects are linked but may have zero or more intermediate objects between the linked objects. Also, any combination of the disclosed features/elements may be used in one or more embodiments.

In addition, the methods and processes described herein may be implemented in a computer program, software, and/or firmware (e.g., a computer program product) incorporated in a computer-readable medium for execution by a computer or processor. That is, the computer program product may include a computer readable storage medium (or media) having computer readable program instructions thereon for causing a controller, processor, or the like to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Examples of computer-readable storage media include, but are not limited to, a register, cache memory, semiconductor memory devices, magnetic media such as internal hard disks and removable disks, magneto-optical media, optical media such as compact disks (CD) and digital versatile disks (DVDs), a random access memory (RAM), a read-only memory (ROM), an erasable programmable read-only memory (EPROM or Flash memory), a static random access memory (SRAM), and a memory stick.

The computer readable program instructions described herein can be communicated and/or downloaded to respective controllers, processors, or the like from an apparatus, device, computer, or external storage via a connection, for example, network communications. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising:

determining, by an authentication engine stored on a memory as processor executable instructions being executed by at least one processor, an authentication mechanism for an external system to a software platform;

generating, by the authentication engine, an interface;

automatically issuing, by the authentication engine, a unified application programmable interface call that uses one or more connections through a single managed bearer token to execute an authentication mechanism;

executing, by the authentication engine, the authentication mechanism within the interface in response to the unified application programmable interface call to provide an authorization layer to the external system independent of an underlying application programmable interface of the external system to enable access control of the external system;

authenticate, by the authentication engine, an entity within the interface; and provisioning, by the authentication engine, element instance details with respect to the authentication of the entity.

2. The method of claim 1, wherein the authentication mechanism is generated based on requirements of the underlying application programmable interface (API) connector of the external system.

3. The method of claim 1, wherein the interface is used to collect information for authentication of the entity.

4. The method of claim 1, wherein the authentication engine provides an authorization layer to the external system that is independent of an underlying application programmable interface (API) connector of the external system.

5. The method of claim 1, wherein the authorization layer combined with the interface provides an OAuth2 experience.

6. The method of claim 1, wherein the authentication engine comprises an identity service that provides a standardized format allowing the interface to receive identity and access management system controls for authentication of the entity.

7. The method of claim 1, wherein generating the interface further comprises generating and presenting a first interface on a display local to the authentication engine or causing an external system to generate and present a second interface based on the authentication mechanism.

8. The method of claim 1, wherein the authentication engine comprises a user interface (UI) generator or a UI presenter that generates the interface for display.

9. The method of claim 1, wherein the authentication engine comprises an application programmable interface (API) support library that stores and manages a set of code libraries that provide backward-compatible versions of any API type or any native API.

10. The method of claim 1, wherein the authentication engine creates a user interface form for each connector at runtime based on a configuration of the one or more connectors.

11. The method of claim 1, wherein the authentication engine issues the unified application programmable interface call by
    establishing a connection via the interface;
    determining whether authentication is supported for the external system by searching an application programable support library;
    facilitating an end user log using the single managed bearer token; and
    provisioning element instances based on the authentication.

12. A system comprising:
    a memory storing processor executable instructions for an authentication engine; and
    at least one processor executing the processor executable instructions to cause the system to:
        determine, by the authentication engine, an authentication mechanism for an external system to a software platform;
        generate, by the authentication engine, an interface;
        automatically issue, by the authentication engine, a unified application programmable interface call that creates and uses one or more connections through a single managed bearer token to execute an authentication mechanism;
        execute, by the authentication engine, the authentication mechanism within the interface in response to the unified application programmable interface call to provide an authorization layer to the external system independent of an underlying application programmable interface of the external system to enable access control of the external system;
        authenticate, by the authentication engine, an entity within the interface; and
        provision, by the authentication engine, element instance details with respect to the authentication of the entity.

13. The system of claim 12, wherein the authentication mechanism is generated based on requirements of the underlying application programmable interface (API) connector of the external system.

14. The system of claim 12, wherein the interface is used to collect information for authentication of the entity.

15. The system of claim 12, wherein the authentication engine provides an authorization layer to the external system that is independent of an underlying application programmable interface (API) connector of the external system.

16. The system of claim 12, wherein the authorization layer combined with the interface provide an OAuth2 experience.

17. The system of claim 12, wherein the authentication engine comprises an identity service that provides a standardized format allowing the interface to receive identity and access management system controls for authentication of the entity.

18. The system of claim 12, wherein generating the interface further comprises generating and presenting a first interface on a display local to the authentication engine or causing an external system to generate and present a second interface based on the authentication mechanism.

19. The system of claim 12, wherein the authentication engine comprises a user interface (UI) generator or a UI presenter that generates the interface for display.

20. The system of claim 12, wherein the authentication engine comprises an application programmable interface (API) support library that stores and manages a set of code libraries that provide backward-compatible versions of any API type or any native API.

* * * * *